Figure 1:
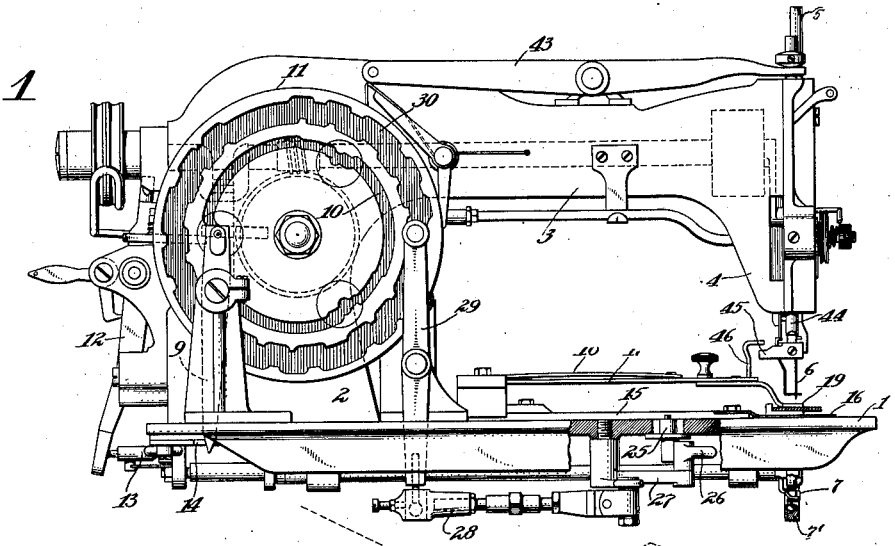

W. L. BARRON AND W. D. MICHENER.
WORK HOLDER FOR SEWING MACHINES.
APPLICATION FILED MAY 8, 1918.

1,361,217.

Patented Dec. 7, 1920.
4 SHEETS—SHEET 1.

WITNESSES
Adrian DeMan.
John F. Heine

INVENTOR
William L. Barron
Wayland D. Michener
BY Henry J. Miller
ATTORNEY

W. L. BARRON AND W. D. MICHENER.
WORK HOLDER FOR SEWING MACHINES.
APPLICATION FILED MAY 8, 1918.

1,361,217.

Patented Dec. 7, 1920.

4 SHEETS—SHEET 2.

WITNESSES
Adrian DeMan.
John F. Heine

INVENTOR
William L. Barron an
Wayland D. Michener
BY
Henry J. Miller
ATTORNEY

W. L. BARRON AND W. D. MICHENER.
WORK HOLDER FOR SEWING MACHINES.
APPLICATION FILED MAY 8, 1918.
1,361,217.
Patented Dec. 7, 1920.
4 SHEETS—SHEET 3.
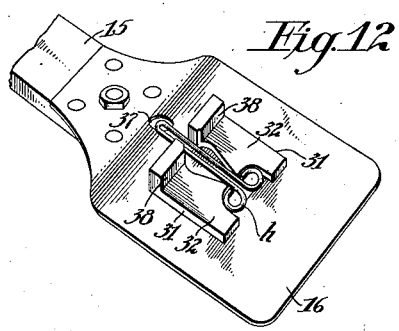
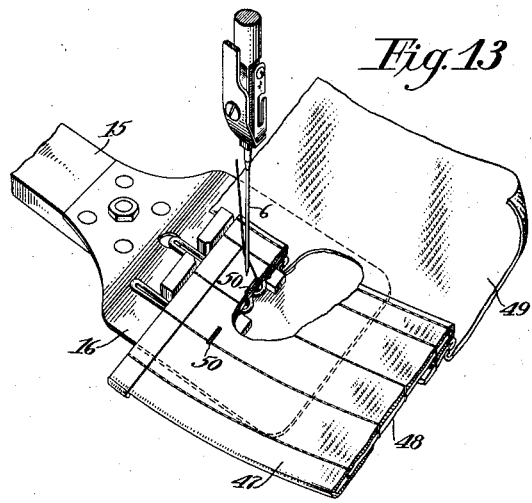
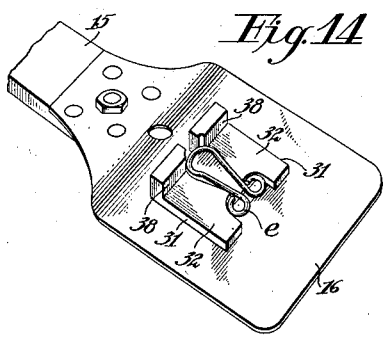
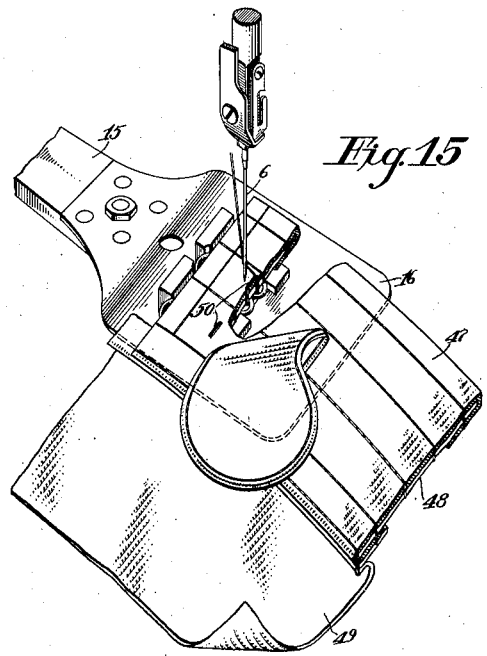
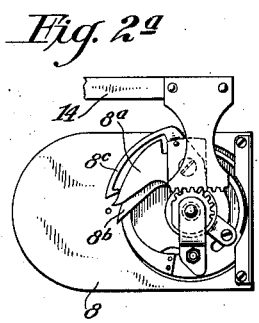
WITNESSES
Adrian DeMan.
John F. Hine.
INVENTOR
William L. Barron
Wayland D. Michener
BY
Henry J. Miller
ATTORNEY

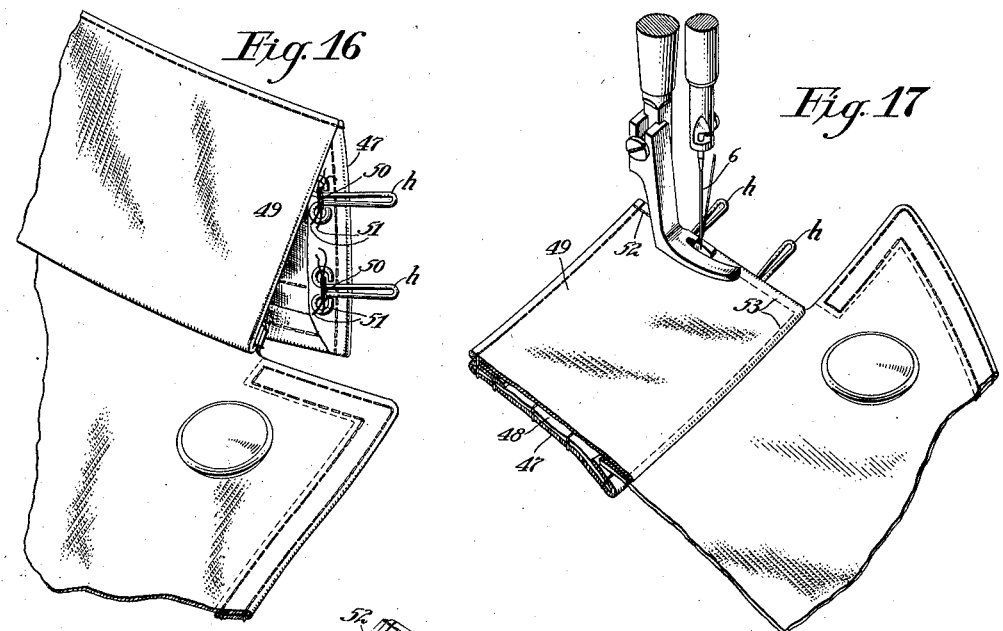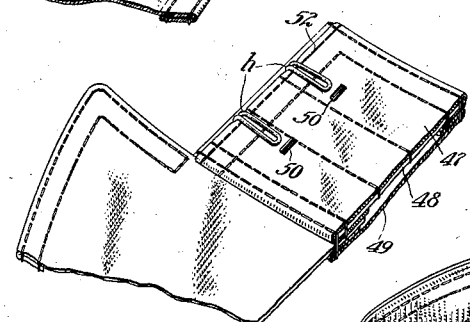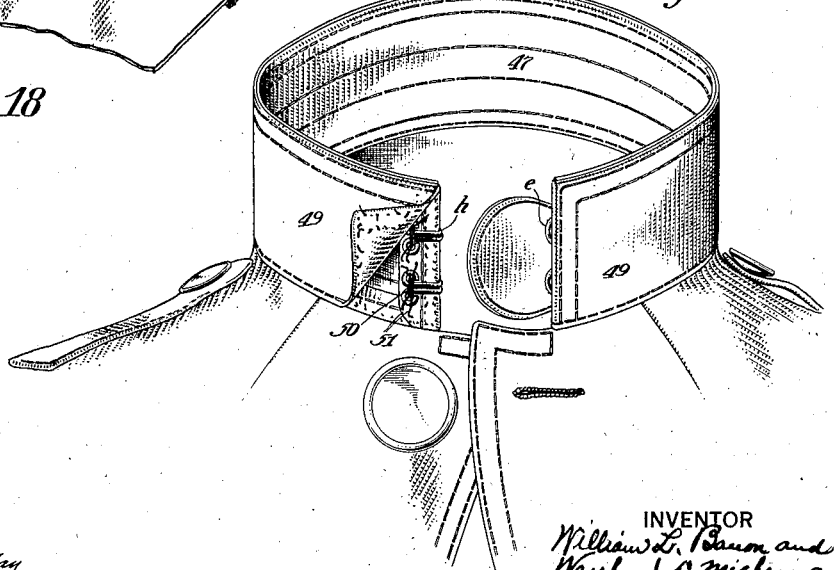

UNITED STATES PATENT OFFICE.

WILLIAM L. BARRON, OF NEWARK, AND WAYLAND D. MICHENER, OF ROSELLE PARK, NEW JERSEY, ASSIGNORS TO THE SINGER MANUFACTURING COMPANY, A CORPORATION OF NEW JERSEY.

WORK-HOLDER FOR SEWING-MACHINES.

1,361,217.  Specification of Letters Patent.  Patented Dec. 7, 1920.

Application filed May 8, 1918. Serial No. 233,302.

*To all whom it may concern:*

Be it known that we, WILLIAM L. BARRON and WAYLAND D. MICHENER, citizens of the United States, residing, respectively, at Newark, in the county of Essex and State of New Jersey, and Roselle Park, in the county of Union and State of New Jersey, have invented certain new and useful Improvements in Work-Holders for Sewing-Machines, of which the following is a specification, reference being had therein to the accompanying drawings.

This invention relates to sewing machines of the type having a reciprocating needle and a work-holder with means for producing lateral to-and-fro jogging movements between them to effect the formation of a so-called "tack" or group of fastening stitches.

Lock-stitch sewing machines of this type, for example such as shown in the U. S. Patents to J. J. Sullivan, No. 777,564, of December 13, 1904, and to W. L. Barron No. 1,093,241, of April 14, 1914, are customarily provided with thread-cutting mechanism below the work-support for nipping the beginning end of the needle-thread below the work and for severing the stitching threads below the work after the group of tacking stitches has been formed. It necessarily follows, therefore, that while the upper face of the work presents a finished appearance, the cut ends of the stitching threads at the under face of the work give to the latter face an unfinished appearance.

Chain-stitch sewing machines of the above type form a group of fastening stitches having a neat and finished appearance at the upper or needle-side of the work, where single strands of needle-threads are laid between consecutive needle-punctures and an unfinished appearance at the under or looper side of the work, caused by thread ends and the bulk of the enchained needle-loops.

In both of the above cases the so-called "tacks," or groups of stitches formed, have a finished appearance at the upper or needle-side of the work and an unfinished appearance at the under or loop-taker side of the work. Moreover, it is well known that a needle-hole in fabric material is burred at the face of the material from which the needle emerges in its penetrative thrust and that consequently the latter face is much less attractive in appearance than the face first entered by the descending needle.

An object of the present invention is to provide a sewing machine adapted for sewing garment-hooks or eyes to the under face of body-fabric material or, in other words, to the face of the material opposite that at which the reciprocating needle is supported, so that the burred ends of the needle-holes, the cut thread-ends or enchained needle-loops, as the case may be, will be disposed at the same face of the body-fabric as the shank of the hook or eye; the idea being to produce work having a finished appearance at the face opposite that to which the hook or eye is secured. Subsequently, the face of the fabric to which the hook or eye is attached is to be covered by an additional ply of material which conceals the shank of the hooks or eye and covers the unfinished side of the group of tacking stitches, giving a neat and finished appearance to both sides of the completed article.

A further object of the invention is to provide a sewing machine work-holder which will hold the sewing eyes of a garment-hook or eye member in stitch-receiving position at the under face of the body-fabric.

A further object of the invention is to provide means facilitating rapid and accurate positioning of the body-fabric in the work-holder so that the hooks or eyes may be attached at the correct distance from the edge of the body-fabric.

Further objects of the invention will appear from the following description and claims.

The invention is shown as embodied in a sewing machine constructed substantially in accordance with the disclosure of said patents, wherein a shiftable work-holder is described having a lower or work-supporting plate and a pair of upper coacting button-gripping levers adapted to locate a button at the upper side of the work with its eyes in stitch-receiving position. In the present instance, however, the work-holder disclosed in said patents has been modified in certain important particulars in adapting it to position a garment-hook or eye below the plane of the fabric.

To this end the lower or plate-like member of the work-holder has secured thereto one or more fixed block-sections affording a raised fabric-supporting surface below the plane of which are disposed curved upstanding walls shaped to closely embrace the sewing eyes of a garment-hook or eye and hold them in stitch-receiving position. In order to secure uniformity of the product the work-supporting plate is preferably provided with positioning means for the edge of the body-fabric to which the hook or eye is to be attached.

The work-holder is particularly adapted to locate the sewing eyes of an unbent garment-hook in stitch-receiving position at the under face of the body-fabric; that is, the face from which the needle emerges in its penetrative thrust, so that the unfinished side of the group of stitches will lie adjacent the hook-shank. This feature is of great importance in adapting the machine to the needs of clothing manufacturers, as will be hereinafter more fully described.

Figure 2:
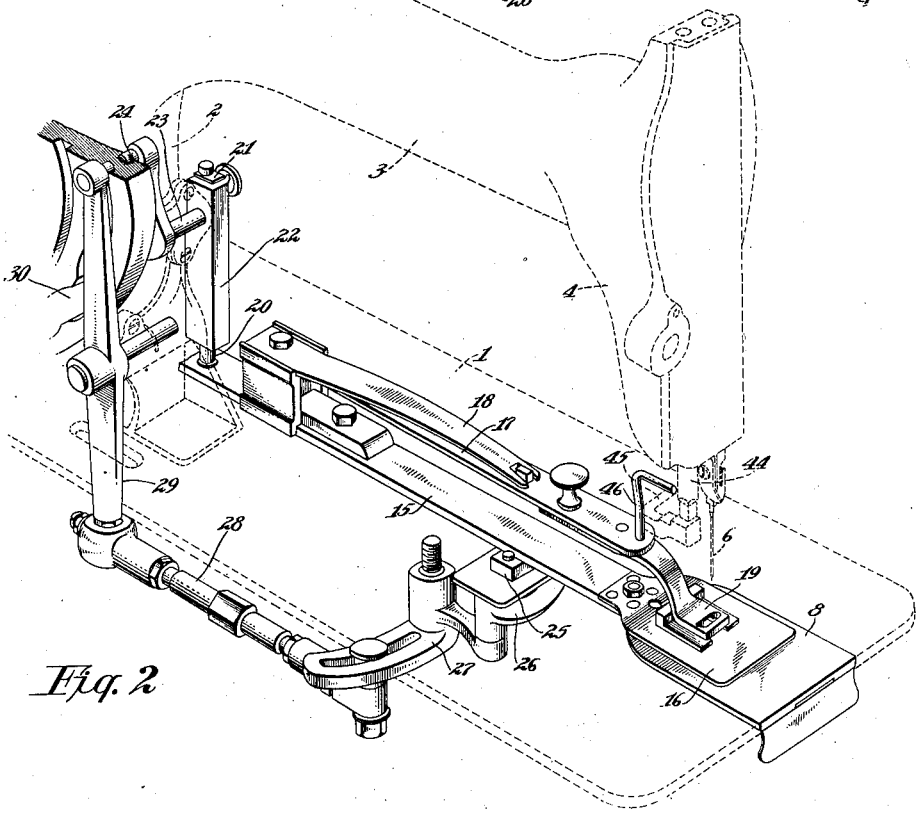
Figure 3:
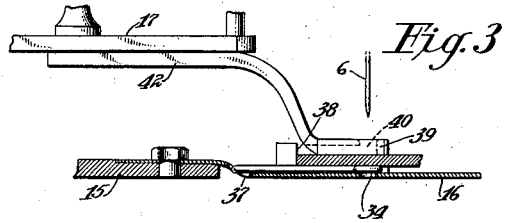
Figure 4:
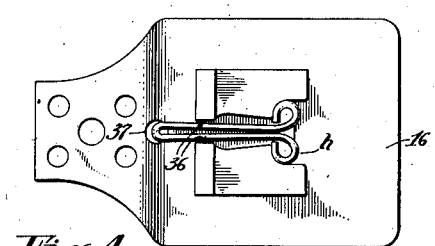
Figure 5:
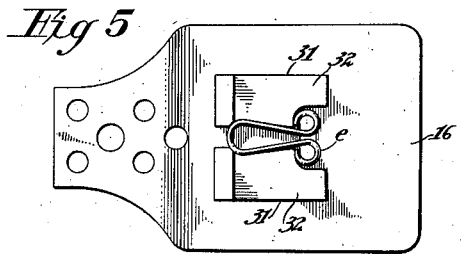
Figure 6:
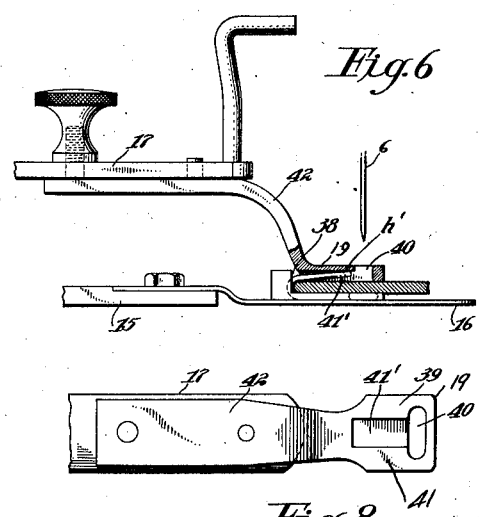
Figure 7:
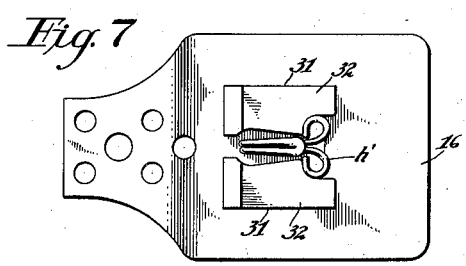
Figure 8:
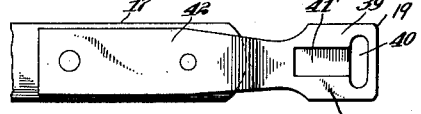
Figure 9:
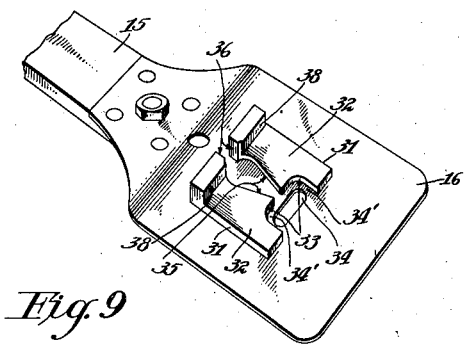
Figure 10:
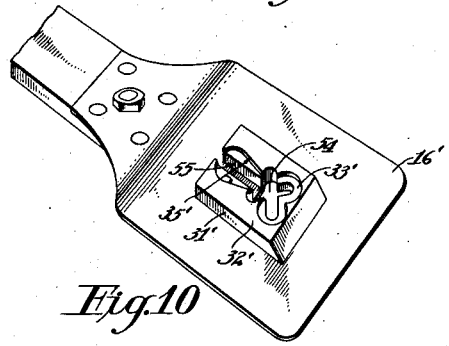
Figure 11:
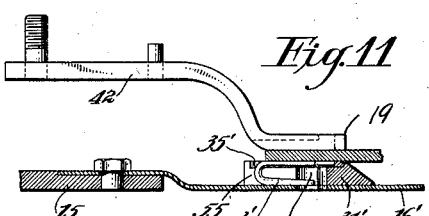

In the accompanying drawings, Figure 1 is a side elevation of a sewing machine embodying the invention. Fig. 2 is a perspective view of the work-holder mechanism of the machine. Fig. 2ª is a bottom plan view of the thread-cutter mounted on the throat-plate of the machine. Fig. 3 is a longitudinal sectional view through the work-supporting plate of the work-holder, showing an unbent garment-hook in stitch-receiving position. Fig. 4 is a plan view of the work-supporting plate showing an unbent garment-hook positioned thereon. Fig. 5 is a view similar to Fig. 4 but showing an eye in stitch-receiving position. Fig. 6 is a view similar to Fig. 3 showing the usual completely bent garment-hook in sewing position in the work-holder. Fig. 7 is a plan view of the work-supporting plate with a bent garment-hook positioned thereon. Fig. 8 is a bottom plan view of the upper or presser-member of the work-holder. Fig. 9 is a perspective view of the work-supporting plate shown in Figs. 1 to 7, inclusive. Fig. 10 is a perspective view of a modified form of work-supporting plate particularly adapted to accommodate a completely bent garment-hook. Fig. 11 is a longitudinal vertical section through the work-supporting plate shown in Fig. 10 with the presser-member in working position. Figs. 12 to 19, inclusive, illustrate a novel method of attaching hooks and eyes, the performance of certain of the steps of which is facilitated by use of the present machine.

In the preferred embodiment of the invention, the sewing machine is of the well known button-sewer type disclosed in the patents above referred to and having a bed 1 from which rises the standard 2 supporting the bracket-arm 3 which terminates in the hollow head 4 wherein the needle-bar 5 carrying the needle 6 is journaled for reciprocation.

The needle coöperates with a suitable loop-taker such as the shuttle 7, mounted in the usual race-way 7' below the bed 1, and suitable thread-cutting mechanism such as that fully described in the said Sullivan patent is provided for trimming the thread ends below the throat-plate 8. Thread cutting mechanism of this character comprises a needle-loop seizing, detaining and severing implement 8ª, a bobbin-thread pull-off and severing implement 8ᵇ and a needle-thread nipping implement 8ᶜ, all constructed and operated in a manner well known and fully described in said patents. This thread-cutting mechanism is actuated in two stages. The first or thread-positioning stage of movement is caused by a lever 9 controlled by the thread-cutter cam-slot 10 in the usual pattern-wheel 11. The second or thread-severing stage of movement is produced by the overthrow of the spring-pressed stop-motion lever 12 which rocks the bellcrank-lever 13 connected to the cutter-actuating slide-bar 14 extending lengthwise of and beneath the bed 1.

In the particular embodiment of the invention chosen for the purpose of this disclosure the relative lateral jogging or stitch-positioning movements between the stitch-forming mechanism and work-holder are obtained by vibrating the work-holder which is preferably of the well known type disclosed in the patents referred to. A work-holder of this type comprises a lower member in the form of a bar 15 mounted for lateral movement over the bed 1. To the forward end of the bar 15 is secured the work-supporting plate 16 which rests upon the throat-plate 8 and is adapted to slide freely thereover. The work-holder also includes an upper member or bar 17 supported at its rear end by the bar 15 and pressed toward the latter by means of the usual leaf-spring 18. The upper bar 17 carries an upper clamping foot 19 at its forward end which yieldingly clamps the work against the plate 16 or parts mounted thereon.

Rising from the rear end of the lower bar 15 is a pivot post 20 which passes through a block 21 of usual construction adjustably mounted in the slotted lever-arm 22, the motion of which arm about the fulcrum-shaft 23 is determined by the cam-groove 24 cut in the inner face of the pattern-wheel. When the block 21 is shifted to the upper end of the lever-arm 22, as shown in Fig. 2, it is substantially coincident with the axis of the fulcrum-shaft 23 and consequently no longitudinal movement will be imparted to the bar 15 by said lever-arm. If the block 21 is adjusted downwardly, the rocking arm 22 will impart motion to the work-holder longitudinally of the bed 1 in the customary manner. Components of motion of the work-holder laterally of the bed 1 or about the pivot-post 20 are derived through the usual train of mechanism including the slide-block 25, curved link 26, bellcrank-lever 27, link 28 and lever 29 which latter is rocked by means of the cam-groove 30 cut in the outer face of the pattern-wheel.

Mounted upon the work-supporting plate 16 are a pair of similar blocks 31 having fabric-supporting surfaces 32 disposed in a plane spaced above the surface of the plate 16 a distance approximately equal to the thickness of the wire constituting the hooks and eyes to be accommodated. The blocks 31 are cut away at their inner forwardly disposed corners to form curved upstanding walls 33 positioned at the opposite ends of the needle-aperture 34 in the plate 16 and shaped to closely embrace and partially surround the sewing eyes at the shank-end of a garment-hook $h$, $h'$ or eye $e$, as shown in Figs. 4, 5 and 7. The needle aperture 34 is somewhat shorter than the distance between the opposed portions of the hook-positioning walls 33, whereby ledges 34' are provided at opposite ends of the needle-aperture for support of the sewing eyes of the hook against the pressure of the upper clamping foot to be described. The inner edges of the blocks 32, in rear of the walls 33, are cut away to form opposed and curved wall-portions 35 shaped to closely embrace the body of an eye $e$, as shown in Fig. 5. The blocks 31 are formed in rear of the walls 33 with opposed wall-portions 36 adapted to position the shank of an unbent garment-hook $h$, Fig. 4, and the plate 16 is apertured at 37 to afford clearance for the tip end of the hook $h$. To insure accurate positioning of the fabric in the work-clamp so that the hooks and eyes may be sewn on at a uniform distance from the edge of the fabric, the blocks 31 are formed at their rearward ends with upstanding fabric-positioning walls 38 constituting a stop.

The upper clamping foot 19 is provided with a needle-aperture 40 of substantially the same size and shape as the aperture 34 in the plate 16 and is formed in its flat under face 41 with a groove 41' adapting it to fit over and position the bill of a completely bent garment-hook $h'$, as shown in Figs. 6 and 8. With the work in position between the upper and lower clamping members it will be seen that the ledges 34' and the portions of the under surface 41 of the presser adjacent the ends of the needle-aperture 40 being, respectively, directly below and above the eye-portions of the garment-hook or eye member, effectively clamp the latter member and fabric-material in sewing position with an application of direct vertical pressure. The clamping foot 19 has an upwardly and rearwardly curved shank 42 which is fixed to the upper clamp-bar 17. The upper member of the clamp may be lifted in opposition to the spring 18 by means of the usual treadle-controlled lever 43 which acts upon the vertical clamp-opening rod 44 journaled in the head 4. At its lower end the rod 44 carries a bent arm 45 which extends under the forwardly directed extremity of the bent post 46 rising from the bar 17.

In the manufacture of many articles of clothing or the like including hook and eye fastening means, such, for example, as military coat collars, it is highly desirable that the finished side of the "tack" or group of fastening stitches used for attaching a hook of eye be located at the face of the fabric to which the shank of the hook or eye is attached, so that the unfinished side of the "tack" may be covered by the same ply of material used for covering the shank of the hook or eye. A military coat collar usually comprises an inner or neck-contacting ply of material 47 reinforced by a stiffening strip 48; an outer ply 49 being secured to the inner ply 47 along the upper edge of the collar prior to the attachment of the collar to the body of the coat.

In the use of the present improvement for attaching hooks and eyes to work of this character, an unbent garment-hook $h$, for example, may be positioned in the work-holder, as shown in Fig. 12, and one end of the reinforced inner ply 47 of the collar is placed against the stop walls 38; the stiffening strip 48 being lowermost. After the clamping foot has been lowered, the machine is started and the hook is sewn on with a group of stitches 50, having a finished appearance at the neck-contacting face of the ply 47, as shown in Figs. 13 and 15, and the usual unfinished appearance at the opposite face caused in the present instance by projecting thread ends 51, Figs. 16 and 19, and burred needle-holes.

The lower edge of the outer ply 49 is then sewn to the upper edge of the coat body, Fig. 16, and the reinforced neck-contacting ply 47 is folded under to the position shown in Fig. 17, in which position the collar is presented to an ordinary straightaway stitching machine which forms a line of stitches 52 along the path indicated by dotted lines 53 to close the end of the collar and secure the lower edge of the neck ply 47 to the coat body. As the bill of the garment-hook $h$ has not been bent into overhanging relation with the shank it will be appreciated that the end of the collar may be readily closed by a line of straightaway machine-made stitches placed close to the end of the collar. After the end of the collar has been closed by the stitches 52 the hook bills are bent over to the position shown in Fig. 18 wherein they overhang the line of stitches 50. Referring to Figs. 18 and 19, it will be seen that both sides of the work now present a neat and finished appearance, the cut thread-ends and the shanks of the hooks and eyes being concealed between the plies 47 and 49. In Fig. 19 a corner of the ply 49 has been ripped back to expose the hook-shanks.

In the modification shown in Figs. 10 and 11, the work-supporting plate 16' carries a block 31' having a raised fabric-supporting surface 32' and an X-shaped needle-aperture 54 to receive the needle during the production of an X-shaped group of stitches. The upper face 32' of the block is recessed at 33' to form the curved upstanding walls adapted to position the sewing eyes of a garment hook or eye. The block 31 is further recessed in its upper face to form the walls 35' for positioning the body of an eye and is slotted longitudinally at 55 to receive and position the down-turned bill of a completely bent garment-hook $h'$, as shown in Fig. 11.

Various modifications of the invention other than those shown and described will readily suggest themselves to those skilled in the art from the foregoing disclosure. The invention, however, is broadly novel; no means having heretofore been provided so far as we are aware for positioning a garment-hook or eye at the under face of a body-fabric so that the unfinished side of the group of stitches with cut thread ends formed by the sewing machine will appear adjacent the shank of the hook or eye to be covered by an additional ply of material covering the said shank.

Having thus set forth the nature of the invention, what we claim herein is—

1. In a sewing machine, in combination, a work-support, stitch-forming mechanism including a reciprocating needle and a complemental loop-taker supported at opposite sides of said work-support, and garment-hook positioning means carried by said work-support and including curved wall-portions shaped to position the stitch-receiving eyes at the shank-end of either a garment-hook or eye member in stitching position relative to said needle and other curved wall-portions shaped to position the body of an eye-member, said positioning means further including spaced wall-portions for positioning the shank of an unbent garment-hook, the same said wall-portions which position the sewing eyes of a hook-member also serving to position the sewing eyes of an eye-member.

2. In a sewing machine, in combination, a work-supporting element formed with an elongated needle aperture smaller than the outside dimensions of the shank-end of a garment hook or eye to be accommodated, means on the work-support for locating the sewing eyes at the shank-end of a garment-hook or eye over the needle aperture in the work-support, and a presser member having a similar needle-aperture and a recessed under face adapted to grip the bill of a garment hook.

3. A work-holder for sewing machines comprising a work-supporting plate with means for moving it over the bed of a sewing machine during the sewing of a group of stitches, a pair of spaced blocks mounted on and above said plate and shaped at their forward ends to embrace and position the sewing eyes at one end of an unbent garment-hook, said blocks being spaced apart at their rearward ends a lesser distance than at their forward ends to snugly embrace and position the body-portion of an unbent garment-hook.

4. A work-holder for sewing machines, comprising a work-supporting plate formed with an elongated needle-aperture, a presser member, a pair of spaced blocks mounted on and above said work-supporting plate at opposite sides of the median line transverse to said needle-aperture, said blocks presenting curved upstanding walls adjacent the ends of the elongated needle-aperture for positioning the sewing eyes of a garment hook, and other upstanding walls in rear of and above the level of said first-mentioned walls for positioning the edge of the body fabric, and means for moving said work-holder over the bed-plate of a sewing machine.

5. In a sewing machine, in combination, stitch-forming mechanism including a reciprocating needle and a complemental loop-taker, means for positioning a body-fabric between said needle and loop-taker for reception of a group of fastening stitches, and means for positioning the sewing eyes at the shank-end of a garment-hook in stitch-receiving position at the face of the work opposite that first entered by the needle in its penetrative thrust, and a thread cutter mounted at the same side of the work as the loop-taker and adapted to sever the sewing thread at the face of the work to which the garment hook is attached.

6. A garment-hook sewing machine having, in combination, a work-support, a reciprocating needle sustained above the work-support, a complemental loop-taker mounted below the work-support, means on said work-support for positioning a garment hook in sewing position at the under face of the fabric, means for relatively moving the needle and work-support laterally to position the fastening stitches, and a thread-cutter below the work-support for severing the sewing thread at that side of the fabric to which the hook is attached.

7. In a sewing machine, in combination, stitch-forming mechanism including a reciprocating needle, and a complemental loop-taker, a work-holder disposed intermediate said needle and loop-taker, a thread-severing implement mounted at the loop-taker side of the work-holder means for producing relative lateral stitch-positioning movements between said stitch-forming mechanism and the work-holder, said work-holder including a presser-member for engaging the face of the work adjacent the needle and a work-supporting member provided with means for positioning a garment-hook at the face of the work adjacent the loop-taker.

In testimony whereof, we have signed our names to this specification.

WILLIAM L. BARRON.
WAYLAND D. MICHENER.